US012759554B1

(12) United States Patent
Ghannam et al.

(10) Patent No.: US 12,759,554 B1
(45) Date of Patent: Oct. 13, 2026

(54) LIGHT-RESPONSIVE VEHICLE OPERATION

(71) Applicant: Ford Global Technologies, LLC, Dearborn, MI (US)

(72) Inventors: Mahmoud Yousef Ghannam, Canton, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/212,856

(22) Filed: May 20, 2025

(51) Int. Cl.

| | |
|---|---|
| ***B60W 30/18*** | (2012.01) |
| ***B60Q 11/00*** | (2006.01) |
| ***B60W 10/04*** | (2006.01) |
| ***B60W 10/18*** | (2012.01) |
| ***B60W 10/20*** | (2006.01) |
| ***B60W 50/02*** | (2012.01) |
| ***G07C 5/00*** | (2006.01) |
| *B60W 50/14* | (2020.01) |

(52) U.S. Cl.
CPC ..... *B60W 30/18163* (2013.01); *B60Q 11/005* (2013.01); *B60W 10/04* (2013.01); *B60W 10/18* (2013.01); *B60W 10/20* (2013.01); *B60W 30/18036* (2013.01); *B60W 50/0205* (2013.01); *G07C 5/008* (2013.01); *B60W 50/14* (2013.01); *B60W 2050/146* (2013.01); *B60W 2420/40* (2013.01); *B60W 2530/201* (2020.02); *B60W 2556/65* (2020.02); *B60W 2710/18* (2013.01); *B60W 2710/20* (2013.01); *B60W 2720/24* (2013.01)

(58) Field of Classification Search
None
See application file for complete search history.

(56) References Cited

U.S. PATENT DOCUMENTS

2005/0195216 A1* 9/2005 Kramer .................... G06F 3/14 345/619
2014/0148988 A1* 5/2014 Lathrop ............. B60W 30/182 701/1
2017/0083794 A1* 3/2017 Nallapa ............... G06F 18/2413
(Continued)

FOREIGN PATENT DOCUMENTS

IN 202411104172 A 12/2024
IN 202521019972 A 3/2025
(Continued)

*Primary Examiner* — Daniel L Greene
(74) *Attorney, Agent, or Firm* — Frank Lollo; Brooks Kushman P.C.

(57) ABSTRACT

First and second vehicles can include respective first and second computers. Upon detecting a fault for a lamp of the first vehicle, and responsive to determining a difference between a perceived dimension of the first vehicle and the actual dimension of the first vehicle, the first vehicle computer can actuate one or more components of the first vehicle to communicate with the second vehicle. Upon detecting the fault for the lamp of the first vehicle, the second vehicle computer can determine an actual dimension of the first vehicle based on data from the first vehicle. Responsive to the difference between the perceived dimension of the first vehicle and the actual dimension of the first vehicle, the second vehicle computer can actuate one or more components of the second vehicle.

20 Claims, 7 Drawing Sheets

(56) References Cited

U.S. PATENT DOCUMENTS

| | | | | |
|---|---|---|---|---|
| 2017/0213459 | A1* | 7/2017 | Ogaz | G08G 1/166 |
| 2017/0240167 | A1* | 8/2017 | Lu | B60W 10/06 |
| 2019/0064254 | A1* | 2/2019 | Bowyer | G01R 31/2808 |
| 2021/0049834 | A1 | 2/2021 | Kale et al. | |
| 2021/0339709 | A1 | 11/2021 | Conway et al. | |
| 2024/0300485 | A1* | 9/2024 | Diamond | B60W 30/0956 |

FOREIGN PATENT DOCUMENTS

| | | | |
|---|---|---|---|
| KR | 20170013077 | A | 5/2021 |
| WO | 2023281175 | A1 | 1/2023 |

* cited by examiner

LIGHT-RESPONSIVE VEHICLE OPERATION

BACKGROUND

Ground vehicles such as automobiles, trucks, etc., commonly operate on roads with other vehicles. Typically, ground vehicles are equipped with exterior lights or lamps. For example, an automobile typically includes headlamps, taillamps, parking lamps, and/or other light sources mounted in or on an exterior of a vehicle body. Various lights or lamps may be illuminated on a vehicle exterior for various purposes, such as illuminating an environment for vehicle occupants and/or making the vehicle visible or more visible to observers outside of the vehicle.

DESCRIPTION

Introduction

Figure 1:
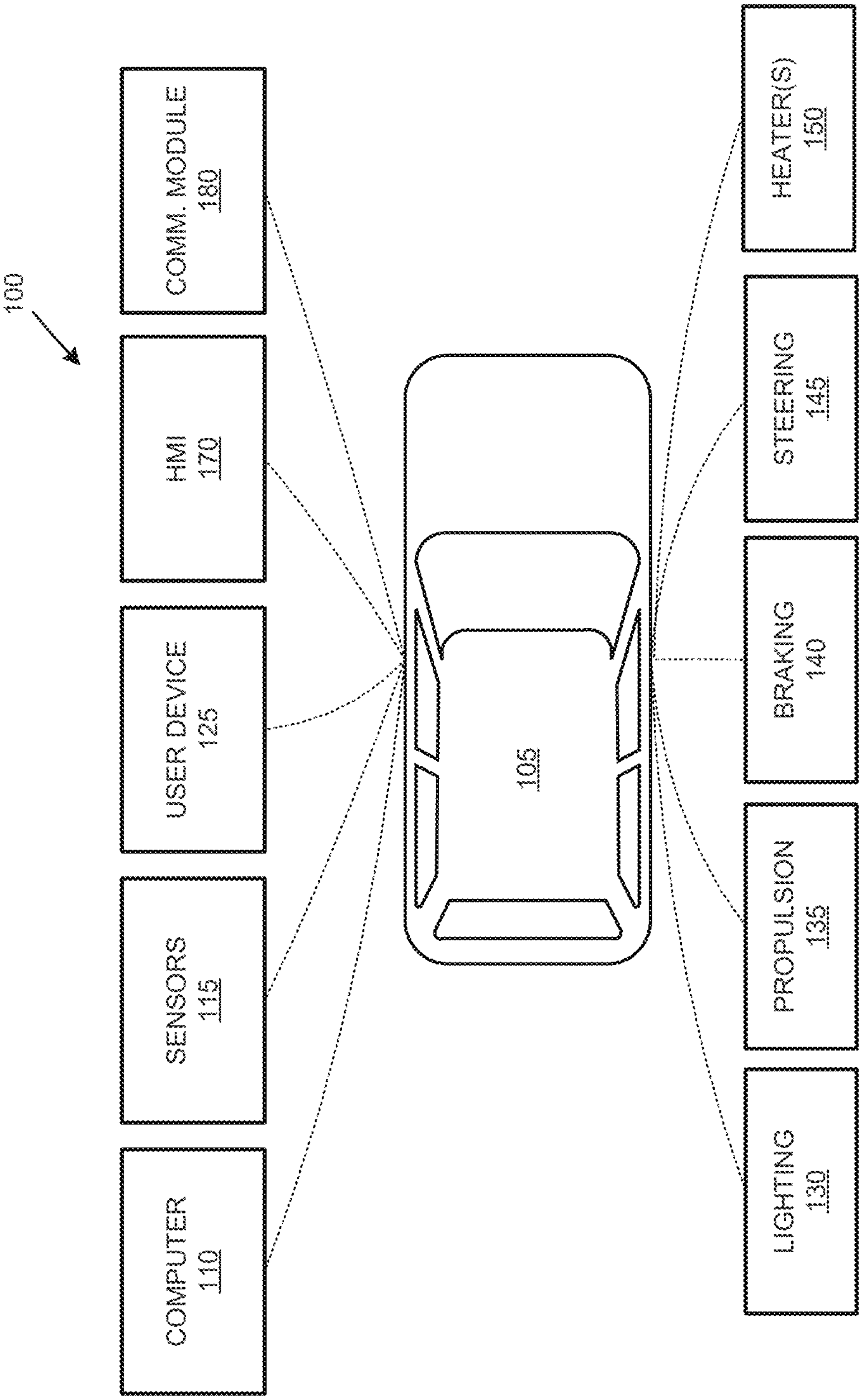
FIG. 1 is a diagram of an example vehicle system.

Described herein are techniques for vehicles to be operated according to working or non-working conditions, or faults, of vehicle light sources, typically exterior lamps such as headlamps, taillamps, parking lamps, and the like. For example, a first vehicle and a second vehicle may be travelling in opposite directions on a road. The first vehicle may detect that an exterior lamp of the first vehicle is not working properly, that is, is in a fault condition or state. In response to detecting its non-working or faulty exterior lamp, the first vehicle can actuate one or more components, such as alternative light or heat sources that can be detected by the second vehicle. The first vehicle may also send a vehicle-to-vehicle message that can be received by the second vehicle describing the light fault condition and providing other information, such as dimensions of the first vehicle that may not be detectable or accurately detectable due to the faulty lamp condition. The second vehicle can then receive the message and actuate components in response to the faulty light condition of the first vehicle. For example, the second vehicle can actuate steering, propulsion, and/or braking to move laterally in a lane to accommodate true dimensions of the first vehicle.

An exemplary system comprises a first computer for first vehicle a second computer for a second vehicle. The first computer is programmed to, upon detecting a fault for a lamp of the first vehicle, and responsive to determining a difference between a perceived dimension of the first vehicle and the actual dimension of the first vehicle, actuate one or more components of the first vehicle to communicate with the second vehicle. The second computer is programmed to, upon detecting the fault for the lamp of the first vehicle, determine an actual dimension of the first vehicle based on data from the first vehicle, and responsive to the difference between the perceived dimension of the first vehicle and the actual dimension of the first vehicle, actuate one or more components of the second vehicle.

The one or more components of the first vehicle can include an infrared lamp and/or a heat source, and the second computer can be programmed to detect the infrared lamp and/or the heat source. The one or more components of the second vehicle can include vehicle braking, steering, and/or propulsion, and actuating the vehicle braking, steering, and/or propulsion includes moving the vehicle laterally in a road lane.

The first computer can be programmed to transmit, via a radio transmitter, a message specifying that the infrared lamp and/or the heat source is actuated, and the second computer can be programmed to receive the message. The first computer can be programmed to transmit, via a radio transmitter, a message specifying the fault for the lamp of the first vehicle and/or the actual dimension of the first vehicle.

An exemplary system comprises a processor and a memory, the memory storing instructions executable by the processor, including instructions to upon detecting a fault for a lamp of a vehicle, compare a perceived dimension of the vehicle to an actual dimension of the vehicle, and, responsive to a difference between the perceived dimension of the vehicle and the actual dimension of the vehicle, actuate one or more components of the vehicle. The one or more components can include an infrared lamp a heat source, a puddle lamp, vehicle braking, vehicle steering, and/or vehicle propulsion. Actuating the vehicle braking, steering, and/or propulsion can include reversing a direction of travel of the vehicle and/or moving the vehicle laterally in a road lane. The instructions can further include instructions to transmit, via a radio transmitter, a message specifying that the infrared lamp and/or the heat source is actuated, and/or specifying the fault for the lamp of the vehicle and/or the actual dimension of the vehicle. Detecting the fault can include predicting the fault based on environmental data and/or road data.

A system for a second vehicle comprises a processor and a memory, the memory storing instructions executable by the processor, including instructions to, upon detecting a fault for a lamp of a first vehicle, determine an actual dimension of the first vehicle based on data from the first vehicle, and, responsive to a difference between a perceived dimension of the first vehicle and the actual dimension of the first vehicle, actuate one or more components of the second vehicle. Detecting the fault for the lamp of the first vehicle can include detecting the fault based on image data. The image data can include infrared data. Detecting the fault for the lamp of the first vehicle includes detecting the fault based on a radio transmission from the first vehicle. The one or more components of the second vehicle can include braking, steering, and/or propulsion of the second vehicle, and actuating the vehicle braking, steering, and/or propulsion includes reversing a direction of travel of the vehicle and/or moving the vehicle laterally in a road lane. The one or more components of the second vehicle can include a display, the instructions further including instructions to provide a representation of the first vehicle on the display based on the actual dimension of the first vehicle.

Example System

Figure 2:
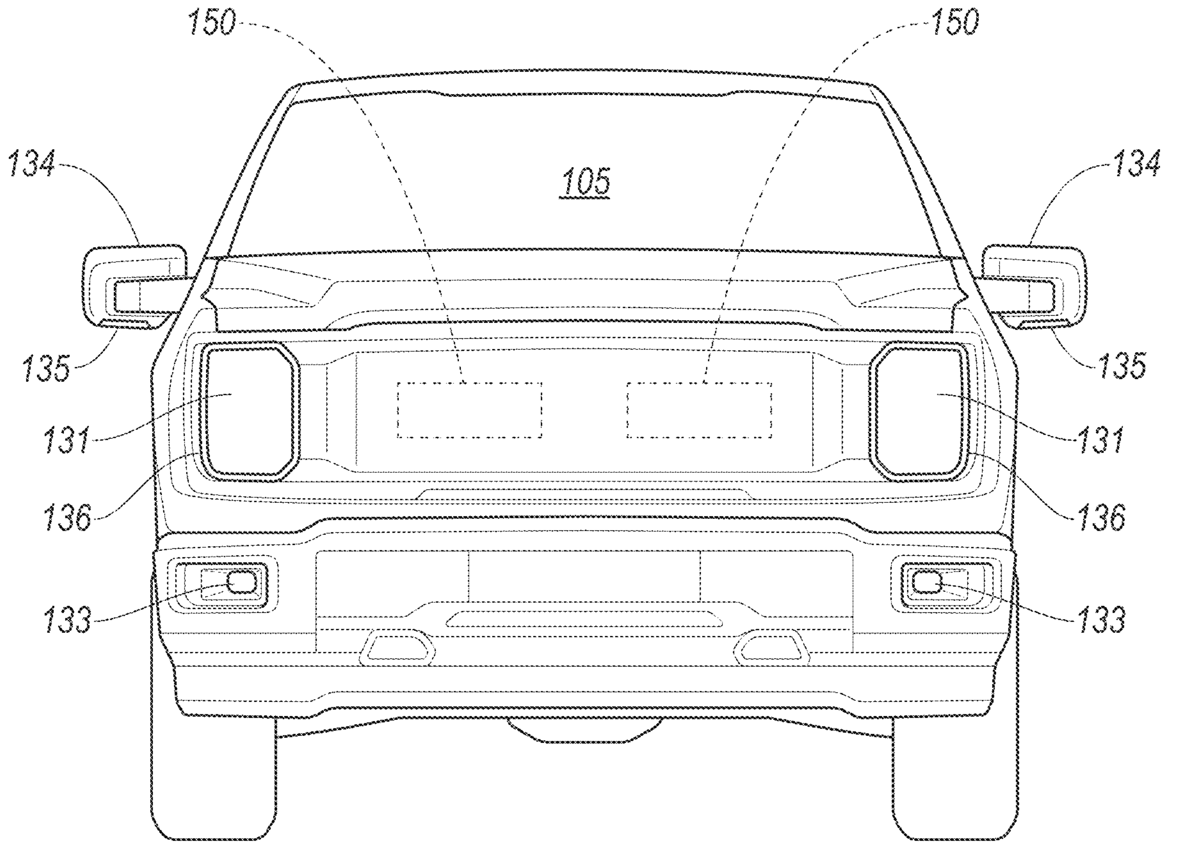
FIG. 2 is a front view of an example vehicle.

Referring to FIGS. 1 and 2, an example system 100 can include one or more vehicles 105, such as vehicles 105-1, 105-2 (see FIG. 30), generically or collectively referred to as a vehicle 105. A computer 110 in the vehicle 105 is programmed to receive data collected from one or more sensors 115, and other sensors (not shown), to provide certain vehicle data. For example, one or more camera sensors 115 may provide image data from a camera's field of view. In another example, one or more radar sensors 115 can provide radar returns from objects such as other vehicles 106. A user device with a touch screen may be disposed in vehicle 105. Example user devices include a vehicle computer 110 communicatively coupled (e.g., via a vehicle network) to an HMI 170 with a touch screen installed as part of a vehicle 105 infotainment system, or a hand-held portable computing device 125 with a touch screen. While all modern original equipment manufacturers (OEMs) of passenger vehicles currently warn drivers against using a handheld portable device while driving a vehicle due to safety concerns, it is expected that technology and the regulatory framework may evolve in the future to where such an activity becomes safe and permissible.

Vehicle data may further include a location of the vehicle 105, data about an environment around a vehicle, data about an object outside the vehicle such as another vehicle, etc. A vehicle location may be provided in a conventional form such as by geo-coordinates such as latitude and longitude coordinates obtained via a navigation system that uses a global navigation satellite system (GNSS) such as the Global Positioning System (GPS) system. Further examples of vehicle data can include measurements of vehicle systems and components (e.g., a vehicle speed or velocity, a level of fuel in a fuel tank, an amount of available electric charge, etc.).

A computer 110 can be provided to control one or more vehicle operations including steering, acceleration, speed control, and/or braking. Accordingly, system 100 is shown comprising vehicle 105 which may include Driver Assistance System (DAS) features. A computer 110 (e.g., one or more vehicle 105 electronic control units, that is, ECUs) can be configured to operate the vehicle 105 independently of operation by an occupant with regard to certain features. A computer 110 may be programmed to provide a driver assistance system (DAS) such as cruise control (where the computer maintains vehicle speed according to a set speed), adaptive cruise control (ACC) (where the computer maintains the vehicle speed according to a set speed but can adjust vehicle speed based on detected distances and/or speeds of other vehicles), and/or hands-free driving. For example, the computer 110 could provide hand-free driving in combination with ACC such that the computer 110 controls steering, braking and acceleration. In another example, the computer 110 could provide ACC and require hands-on operation. The computer 110 may be programmed to operate a lighting system 130, powertrain propulsion system 135, a braking system 140, a steering system 145, a device screen that displays a Human Machine Interface (HMI) 170, and/or other vehicle systems.

A computer 110 is generally programmed for communications on a vehicle network (not shown), for example, a conventional vehicle communications bus such as a Controller Area Network (CAN) bus, a Local Interconnect Network (LIN) bus, etc., and/or other wired and/or wireless technologies such as Bluetooth®, Wi-Fi®, Ethernet, etc. via the network, bus, and/or other wired or wireless mechanisms (e.g., a wired or wireless local area network in the vehicle 105), the computer 110 may transmit messages to various devices in the vehicle 105 and/or receive messages from the various devices such as sensors 115, controllers and actuators (not shown), etc.

Alternatively or additionally, for example, in cases where the computer 110 actually comprises multiple devices, the vehicle network may be used for communications between devices represented as the computer 110 in this disclosure. For example, the computer 110 can be a generic computer with a processor and memory as described above, and/or may include a dedicated electronic circuit including an application specific integrated circuit (ASIC) that is manufactured for a particular operation such as an ASIC for processing sensor data and/or communicating the sensor data. In another example, the computer 110 may include a Field-Programmable Gate Array (FPGA), which is an integrated circuit manufactured to be configurable by a user. Typically, a hardware description language such as Very high speed integrated circuit Hardware Description Language (VHDL) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in computer 110.

In addition, the computer 110 may be programmed for communicating with a network and/or devices outside of the vehicle (not shown), which may include various wired and/or wireless networking technologies such as cellular, Bluetooth®, Bluetooth® Low Energy (BLE), wired and/or wireless packet networks, etc.

The memory can be of any type, for example hard disk drives, solid state drives, servers, or any volatile or non-volatile media. The memory can store the collected data sent from the sensors 115. The memory can be a separate device from the computer 110, and the computer 110 can retrieve data stored in the memory via a network in the vehicle 105, for example over a CAN bus, a wireless network, etc. Alternatively or additionally, the memory can be part of the computer 110 (e.g., as a memory of the computer 110).

Sensors 115 can include a variety of devices. For example, various controllers in a vehicle 105 may operate as sensors 115 to provide data via the vehicle network or bus such as data relating to vehicle speed, acceleration, location, subsystem and/or component status, etc. Further, other sensors 115 could include cameras, motion detectors, etc. (i.e., sensors 115 may provide data for evaluating a status of a component, evaluating a slope of a roadway, etc.). The sensors 115 could, without limitation, also include short range radar, long range radar, light detection and ranging (LIDAR), ultrasonic transducers, and the like. Cameras can include optical cameras (e.g., in the visible spectrum), and/or other kinds of cameras such as time-of-flight, infra-red, etc.

In one example, the vehicle 105 includes one or more thermal camera sensors 115. Thermal cameras, one type being far-infrared cameras, can be used to detect animals in both low light and light-obscured conditions. Thermal cameras provide images in various lighting conditions (night, sun glare, etc.) and weather conditions (fog, rain, etc.) that can be superior to the contrast provided by cameras limited to the visible light region.

Collected data can include a variety of data collected in a vehicle 105. Examples of collected data are provided above. Data are generally collected using one or more sensors 115, and may additionally include data calculated therefrom in the computer 110. In general, collected data may include any data gathered by the sensors 115 and/or computed from such data.

The vehicle 105 can include a plurality of vehicle components. In this context, a vehicle component may include one or more hardware components adapted to perform a mechanical function or operation-such as moving the vehicle 105, slowing or stopping the vehicle 105, steering the vehicle 105, etc. Non-limiting examples of components include a lighting system 130, powertrain propulsion component 135 (that includes, e.g., an internal combustion engine and/or electric motor, etc.), a transmission component, a steering assembly (e.g., that may include one or more of a steering wheel, a steering rack, etc.), a brake component 140, a park assist component, an adaptive cruise control component, an adaptive steering component 145, a movable seat, and the like. Components can include computing devices such as electronic control units (ECUs) or the like and/or computing devices such as described above with respect to the computer 110, and that likewise communicate via a vehicle network.

Referring to FIG. 2 as well as FIG. 1, the lighting system 130 can include various lamps to emit light in the visible and/or infrared spectra. Herein, the term "lamp" means a component that emits light, that is, an emission in the visible and/or infrared light spectra. A lamp can include one or more light emitting diodes (LEDs), for example. The lighting system can include headlamps 131, parking lamps 133, puddle lamps 135, infrared lamps 136, taillamps, side lamps, and/or other vehicle lamps.

Further, vehicle 105 may include one or more heating elements or heaters 150, which may be disposed on or within a vehicle body. For example, as illustrated in FIG. 2, heaters 150 can be disposed behind a fascia or bumper of vehicle 105. Heaters 150 of a first vehicle 105-1 can be activated to be detectable by infrared camera sensors 150 of a second vehicle 105-2. A heater 150 can be provided according to any suitable heating element or heating mechanism, such as including an electric heater that employs resistive heating to emit heat.

The HMI 170 typically includes one or more of a display, a touchscreen display, a microphone, a speaker, etc. The user can provide input to devices such as the computer 110 via the HMI 170. The HMI 170 can communicate with the computer 110 via the vehicle network; for example, the HMI 170 can send a message including the user input provided via a touchscreen, microphone, a camera that captures a gesture, etc., to a computer 110, and/or can display output such as via a screen, speaker, etc.

In addition, the vehicle computer 110 may be configured for communicating via a vehicle-to-vehicle communication module 180 or interface with devices outside of the vehicle 105 (e.g., through a vehicle-to-vehicle (V2V) or vehicle-to-infrastructure (V2X) wireless communications (cellular and/or short-range radio communications, etc.) to another vehicle, and/or to a remote server computer (typically via direct radio frequency communications)). The communications module 180 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 180 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 180 according to any suitable short-range communications mechanism (e.g., DSRC, cellular, or the like).

Implementation Examples

FIG. 2 is a front view of a vehicle 105, illustrating further aspects of the vehicle 105. As mentioned above, a lighting system 130 can include headlamps 131 and parking lights 133. In addition, the vehicle 105 may be provided with one or more heaters 150, such as an electric heater which may be disposed behind a vehicle 105 bumper, grill, and/or fascia. Further, puddle lamps 135 may be disposed, for example embedded in, a bottom of a rearview mirror housing 134 to project light onto a road 200 or other ground surface. Headlamps 131 typically emit light in the visible spectrum. Moreover, infrared lamps 136 can be provided in a variety of manners, such as in the form of LEDs arranged next to or around headlamps 131. The present description is not limited to the lamps and/or heat sources shown in FIG. 2. It is to be understood that a vehicle 105 could include other lamps and/or heat sources than as depicted in FIG. 2. For example, a vehicle 105 may have parking or running lights or the like exposed on sides or at a front or rear of the vehicle 105, and typically taillamps will be disposed at a rear of the vehicle 105.

Figure 3:
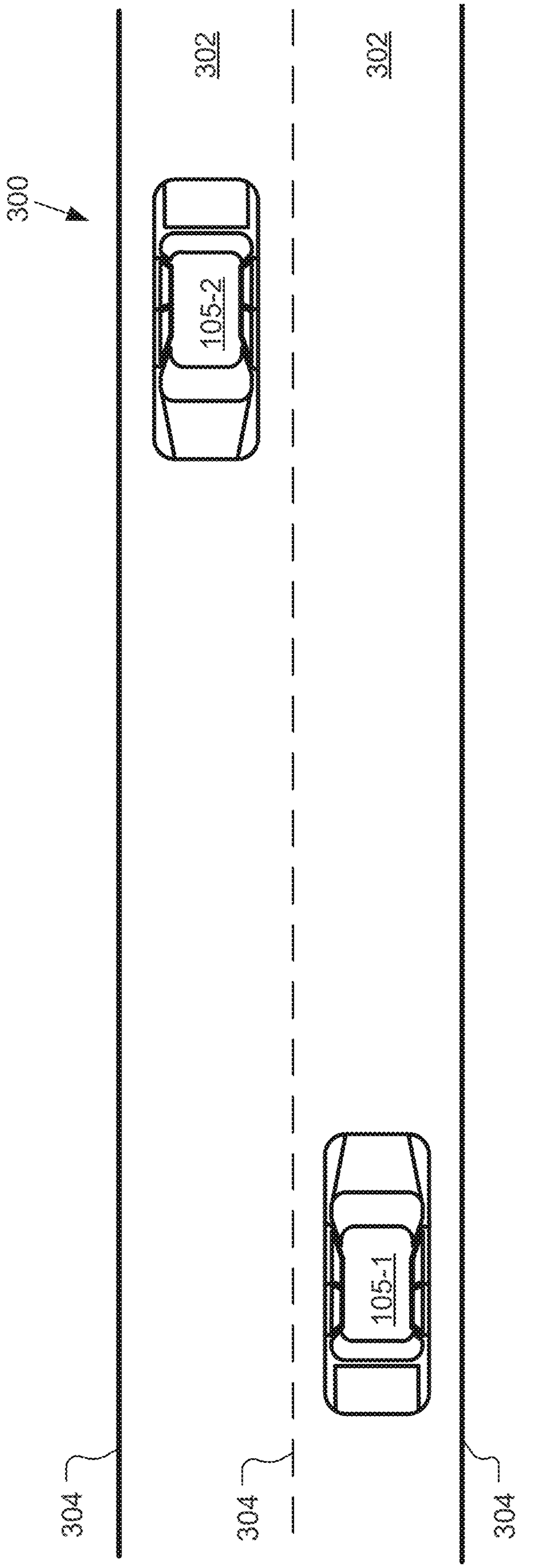
FIG. 3 illustrates an example road on which vehicle may travel.

FIG. 3 illustrates an example road 300 with lanes 302 defined by lane boundaries 304. Vehicles 105-1 and 105-2 are shown travelling in lanes 302. In the illustrated example, the vehicle 105-1 travels in a first direction in a first lane 302, and the vehicle 105-2 travels in a second direction in a second lane 302. A computer 110 in a first vehicle 105-1 can be programmed to, upon detecting the fault for the lamp of the first vehicle 105-1, and responsive to determining a difference between the perceived dimension of the first vehicle 105-1 and the actual dimension of the first vehicle 105-1, actuate one or more components of the first vehicle 105-1 to communicate with the second vehicle 105-2. For example, when headlamps 131, taillamps, and/or other lamps of a vehicle 105-1 are not emitting light as expected, alternative infrared or visible light sources, such as parking lamps 133, puddle lamps 135, and/or infrared lamps 136, can be activated to emit light for detection by another vehicle 105-2. Thus, the vehicle 105-2 and/or an operator thereof may be apprised of an actual dimension or shape or size of the vehicle 105-1, whereas the vehicle 105-2 or an operator thereof might otherwise not properly apprehend or sense the vehicle 105-1, for example, because a missing or inactive headlamp could make the vehicle 105-1 appear smaller, for example narrower, than it actually or really is.

A second computer 110 in the second vehicle 105-2 can be programmed to, upon detecting a fault for a lamp (e.g., a headlamp 131) of the first vehicle 105-1, determine an actual dimension of the first vehicle 105-1 based on data from the first vehicle. A computer 110 in a second vehicle 105-2 could determine an actual dimension of the first vehicle 105-1 in a variety of ways, such as by receiving a message from the vehicle 105-1 specifying the actual dimension, (e.g., specifying a width of the vehicle 105-1), by detecting infrared lamps 136 and/or heat sources 150 of the first vehicle 105-1, etc.

A "fault" of a vehicle lamp 131 means that the lamp 131 is not emitting light at all when the lamp is expected to be emitting light and/or that the lamp is emitting light below an expected intensity threshold (for example, measured in lumens). A fault can be detected in a variety of ways. For example, data on a vehicle communication bus, such as a trouble code or the like, could indicate a fault in a lamp 131, such as that the lamp 131 is not emitting light even when activated. Alternatively or additionally, camera sensor is 115 could capture images that are analyzed to determine if lamps 131 are emitting light.

Yet further alternatively or additionally, detecting a fault could include predicting the fault based on a remaining useful life estimate or prediction. For example, detecting a fault could include predicting the fault based on environmental data and/or road data. For example, a machine learning program could be trained with data indicating types of environments in which a vehicle 105 (or representative test vehicle 105 of a similar type such as make and model) is operated to predict a lifespan of a lamp 131. Environmental data that could be input to the machine learning program might include temperature data, precipitation data, and/or humidity data. Environmental data could further include location data, such as a latitude at which a vehicle 105 is typically operated, indicating average hours of daylight or darkness in which the vehicle 105 may be operated with or without activation of lamps 131. Yet further alternatively or additionally, road data could include data about a type of surface or roughness of roads on which a vehicle 105 is typically operated. For example, operating a vehicle 105 on gravel or dirt roads, or roads that are likely to be rougher, may lead to a shorter lifespan for lamps 131 than smoother roads, such as interstate highways. Yet further alternatively or additionally, another suitable remaining useful life prediction could be utilized.

The data in a message from the first vehicle 105-1 can include one or more types of data, and/or could be provided via various media. For example, one possible medium for providing data from a vehicle 105 is a radio frequency transmission (or transmission via some other communications medium) using a protocol that supports vehicle-to-vehicle (V2V) and/or vehicle-to-everything (V2X) communications. A message sent via vehicle-to-vehicle communications could include different types of data such as specifying a fault indication of a vehicle 105 lamp, typically specifying a vehicle 105-1 lamp that is not working properly or as expected (e.g., a message could specify that a front right headlamp 131 is not working). Further, a message could provide an indication of a heat source 150, and/or a lamp such as a puddle lamp 135 or infrared lamp 136, that has been actuated (i.e., is activated or "on"), typically to compensate for the lamp for which a fault is identified or specifies. A message may include other information, such as a true or actual dimension of the first vehicle. The data from the first vehicle 105-1 could be provided from a computer 110 via a radio transmitter or the like in a communication module 180.

Alternatively or additionally, data from a vehicle 105 such as the first vehicle 105-1 could include data sensed or detected in another vehicle 105 such as the second vehicle 105-2. For example, sensors 115 in the second vehicle 105-2 could obtain an image of the first vehicle 105-1, and using image analysis techniques, determine a presence of a fault for a lamp of the first vehicle 105-1, for example, that the lamp was not illuminated as expected, or that the lamp was emitting light below an expected intensity threshold. A vehicle 105-2 computer 110 could include programming to determine that a lamp of another vehicle 105-1 is not illuminated as expected or is illuminated below an expected intensity threshold (e.g., in lumens) based on various factors such as a time of day, environmental factors such as an amount of ambient light, precipitation, or other weather conditions, around the vehicles 105.

In an example, the computer 110 in the first vehicle 105-1 could transmit a message specifying that an infrared lamp 136 and/or heat source 150 is actuated, and a second vehicle 105-2 computer 110 could be programmed to receive the message. A computer 110 in the second vehicle 105-2 could be programmed to detect the infrared lamp 136 and/or the heat source 131. Alternatively or additionally, as noted above, the second vehicle 105-2 could receive from a first vehicle 105-1 a message specifying an actual or true dimension, shape, and/or size of the first vehicle 105-1.

A computer 110 in the second vehicle 105-2 could then, responsive to a difference between a perceived dimension of the first vehicle 105-1 and the actual dimension of the first vehicle 105-1, actuate one or more components of the second vehicle 105-2. For example, as noted above, data from sensors 115 in the second vehicle 105-2 could indicate that the first vehicle 105-1 is narrower than it actually is, for example, because a headlamp 131 expected to be illuminated is inactive. In some examples, a difference between a perceived dimension and an actual dimension of a vehicle 105-1 could result in a computer 110 in a second vehicle 105-2 misclassifying or misidentifying the vehicle 105-1, such as, where a headlamp 131 on one side of a vehicle 105-1 is missing or inactive, determining that the vehicle 105-1 is a motorcycle rather than a passenger automobile.

Accordingly, computer 110 in the first vehicle 105-1 could be programmed to, upon detecting a fault for a lamp of the first vehicle 105-1, compare a perceived dimension of the first vehicle to the actual dimension of the first vehicle. In some examples, comparing a perceived dimension of the first vehicle 105-1 to its actual dimension in the computer 110 of the first vehicle 105-1 means determining that the perceived dimension, that is, the size or shape perceived by an observer outside the first vehicle 105-1, such as in a second vehicle 105-2, is different from an actual dimension, typically based on a dimension threshold.

The actual dimension could be stored in a memory of or accessible to the computer 110. Further, the computer 110 could store perceived dimensions associated with faults of respective lamps 131. For example, referring to FIG. 2, if a right headlamp 131 has a fault but a left headlamp 131 is operating properly, then the computer 110 could store a perceived dimension based on an oncoming observer viewing only the left headlamp 131. For example, the perceived dimension could be a quarter to a third of the actual dimension. Perceived dimensions associated with respective lamps 131 could be determined by empirical testing and then stored in the memory of (or a memory accessible to) to computer 110.

The dimension threshold is a distance such as a length or width that can be provided for comparison to a difference between a perceived dimension of a first vehicle 105-1 and an actual dimension of the vehicle 105-1. Responsive to the difference between the perceived dimension of the first vehicle 105-1 and the actual dimension of the first vehicle 105-2 (e.g., the difference exceeding the dimension threshold), a computer 110 in the second vehicle 105-2 can actuate one or more components of the second vehicle 105-2.

The one or more components actuated by the computer 110 in the second vehicle 105-2 can include braking 140, steering 145, and/or propulsion 135. For example, based on a difference between a perceived and actual dimension of a first vehicle 105-1, a second vehicle 105-2 could move laterally in a lane 302. For example, the second vehicle 105-2 could be travelling in a center of a lane 302, that is, with a center longitudinal axis of the vehicle 105-2 generally equidistant from respective boundaries 304 of the lane 302. Upon determining a difference between perceived and actual dimensions of a first vehicle 105-1, for example, the difference exceeding a dimension threshold, a computer 110 in the second vehicle 105-2 could actuate steering 145 to move the second vehicle 105-2 toward a boundary 304 further from and not shared by a boundary 304 of a lane of travel of the vehicle 105-1. Alternatively or additionally, the computer 110 in the second vehicle 105-2 could actuate braking 140 and/or propulsion 135 to change a speed of the second vehicle 105-2 as the vehicle 105-2 passes the vehicle 105-1 which is travelling in an opposing direction.

As mentioned above, a computer 110 in a vehicle 105 could, upon detecting a fault for a lamp 131 of the vehicle 105, compare a perceived dimension of the vehicle 105-2 to an actual dimension of the vehicle 105. Responsive to a difference between the perceived dimension of the vehicle 105 and the actual dimension of the vehicle 105, a computer 110 could actuate one or more components of the vehicle 105. For example, the computer 110 could actuate HMI 170 to provide output, (e.g., via a display, haptic output, etc.), to a vehicle 105 occupant to inform the occupant that the lamp 131 was not illuminated even when a vehicle control or setting for the lamp 131 is "on." Alternatively or additionally the computer 110 could actuate braking 140, steering 145, and/or propulsion 135. For example, referring again to the illustration of FIG. 4, a vehicle 105-1, upon detecting a fault in one or more of its lamps 131, could actuate steering 145 to move the vehicle 105-1 laterally, for example, away from center of a lane of travel 302 and toward a boundary further from and not shared by a boundary 304 of a lane of travel of the vehicle 105-2.

Figure 4:
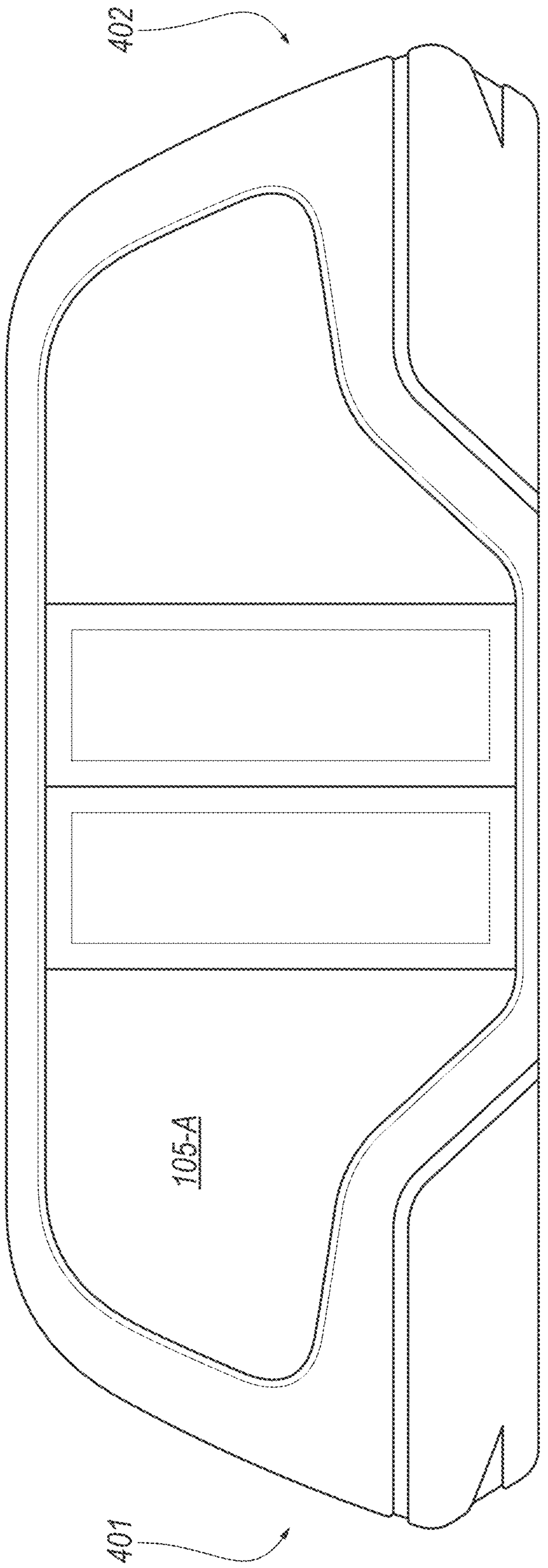
FIG. 4 is a side view of an example vehicle.

In some examples, actuating braking 140, steering 145, and/or propulsion 135 includes reversing a direction of travel of the vehicle 105. For example, FIG. 4 illustrates an example vehicle 105-A that is configured to travel along a route with either of a first end 401 or a second end 402 serving as the "front" of the vehicle 105-A, that is, the vehicle 105-A can travel interchangeably in a first direction where the first end 401 is a leading end or in a second direction where the second end 402 is a leading end. Upon detecting a fault in a lamp 131 in a vehicle 105-A, a computer 110 can actuate braking 140, steering 145, and/or propulsion 135 to reverse the direction of travel of the vehicle 105-A such that an end 401, 402 including the faulty lamp 131 is at a rear of the vehicle 105-A with respect to a direction of travel of the vehicle 105-A. Typically, reversing the direction of travel of the vehicle 105-A may include executing a turn-around maneuver (e.g., a three-point turn or the like on a road 200 or other available surface suitably clear of traffic and obstacles). That is, the vehicle 105-A can be maneuvered so that oncoming other vehicles 105 will perceive lamps 131 on the oncoming end 401, 402 that was illuminated, and the faulty lamp 131 will be hidden from view.

Example Process

Figure 5:
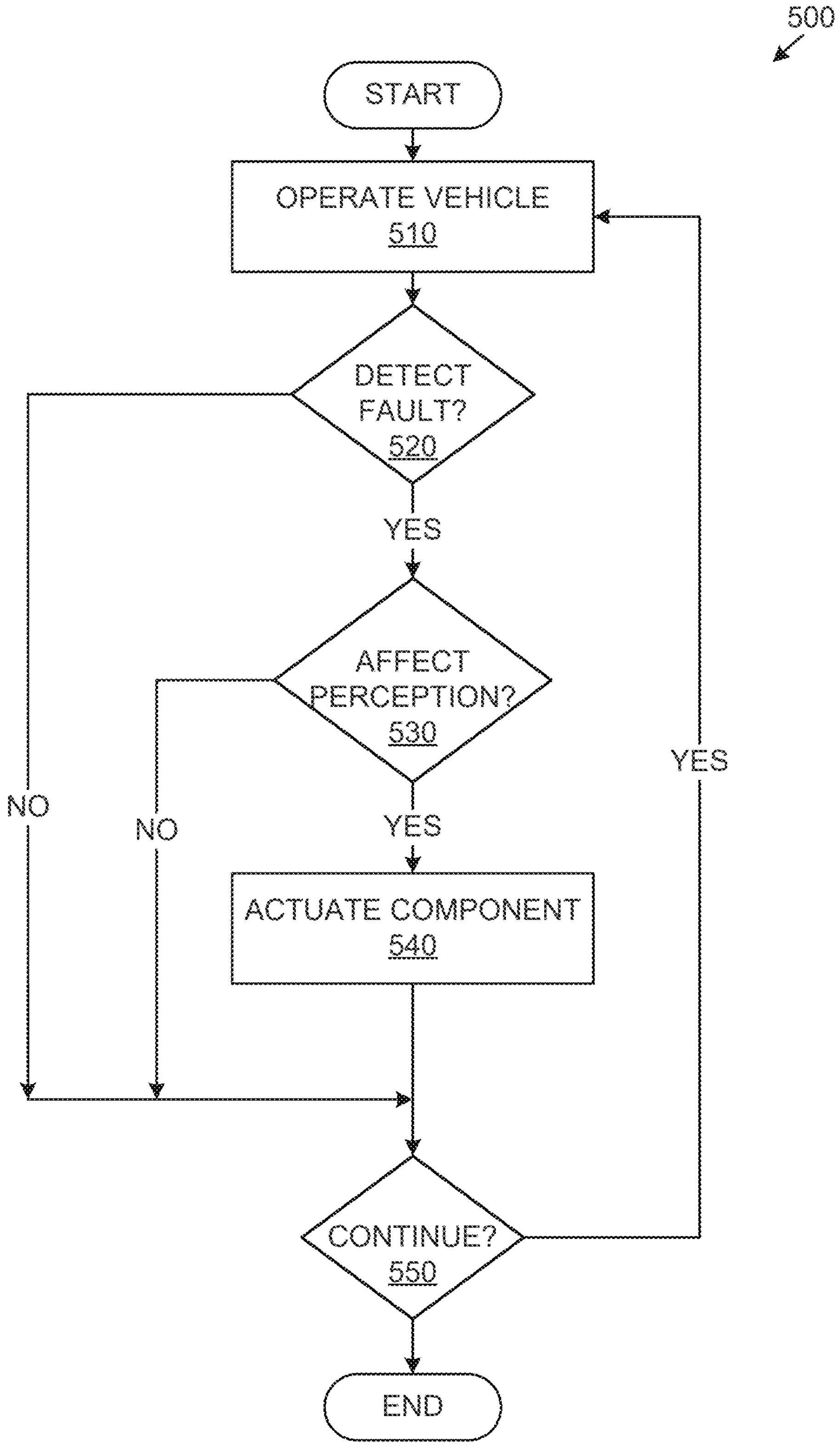
FIG. 5 is a diagram of an example process for detecting a lamp fault in a vehicle and operating the vehicle in response to the detected fault.

FIG. 5 is a diagram of an example process 500 for operating a vehicle 105-1 for detecting a fault in a lamp 131 of the vehicle 105-1, and responding to the detected fault. Blocks of the process 500 can be carried out according to instructions stored in memories, and executed by processors, of, one or more vehicle computers 110 in the vehicle 105-1.

The process 500 begins in a block 510, in which a vehicle 105-1 is operated on a roadway 200, during which operation a computer 110 in the vehicle 105-1 monitors for possible faults in lamps 151.

In a block 520, following the block 510, the computer 110 determines whether a fault in a lamp 131 has been detected. For example, a computer 110 in a vehicle 105-1 may detect fault in a lamp 131 of the vehicle 105-1 by predicting the fault as described above. If a fault has been protected, then a block 530 is executed next; otherwise, the process 500 proceeds to a block 550.

In the block 530, the computer 110 determines whether the detected lamp 131 fault could affect perception of the vehicle 105-1 by an observer outside the vehicle 105-1, such as sensors 115 and/or an occupant of a second vehicle 105-2. For example, as described above, the computer 110 could determine whether a difference between an actual and a perceived dimension of the vehicle 105-1 exceed a dimension threshold. If the computer 110 determines that perception of the vehicle 105-1 could be affected, then the process 500 proceeds to a block 540. Otherwise, the process 500 proceeds to the block 550.

In the block 540, the computer 110 commands or causes actuation of a vehicle 105-1 component, such as the HMI 170, lighting 130, propulsion 135, braking 140, steering 145, and/or heaters 150, as described above. Further alternatively or additionally, the computer 110 could cause a message to be sent, for example a radio transmission via the communication module 180 according to a vehicle-to-vehicle (V2V) communication protocol, to be received by a second vehicle or vehicles 105-2. Following the block 540, the process 500 proceeds to the block 550.

In the block 550, which may follow one of the blocks 520, 530, it is determined whether the process 500 should continue. For example, an operator could deactivate the process 500, a vehicle 105-1 could be powered down or could stop, etc. If the process 500 is to continue, the process returns to the block 510. Otherwise, the process 500 ends following the block 550.

Figure 6:
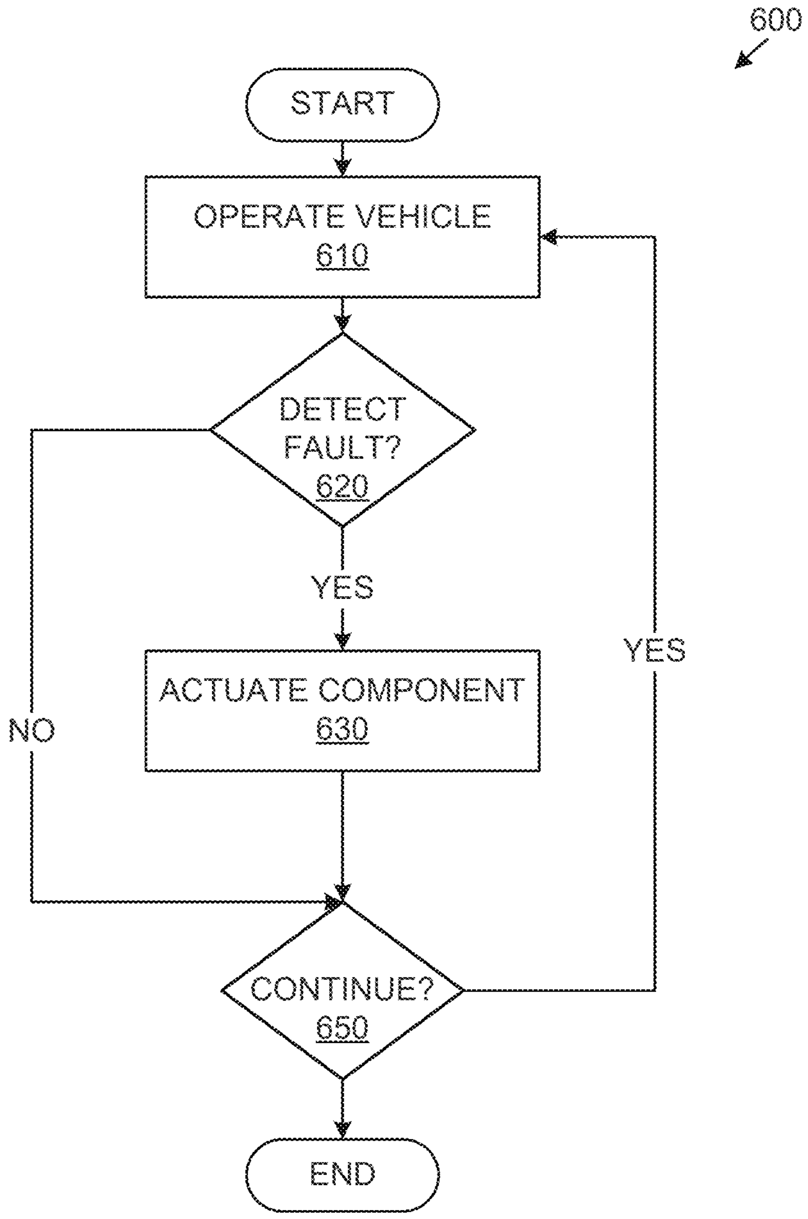
FIG. 6 is a diagram of an example process for detecting a lamp fault in a first vehicle and operating a second vehicle in response to the detected fault in the first vehicle.

FIG. 6 is a diagram of an example process 600 for detecting a lamp 131 fault in a first vehicle 105-1 and operating a second vehicle 105-2 in response to the detected fault in the first vehicle 105-1. Blocks of the process 600 can be carried out according to instructions stored in memories, and executed by processors, of one or more computers 110 in the second vehicle 105-2.

The process 600 begins in a block 610, in which a vehicle 105-2 is operated on a roadway 200, during which operation a computer 110 in the vehicle 105-2 monitors for possible faults in lamps 151 of other vehicles 105-2 on the roadway 200.

In a block 620, following the block 610, the computer 110 in the vehicle 105-2 determines whether a fault in a lamp 131 of another vehicle 105-1 on the roadway 200 is detected. For example, the vehicle 105-2 could receive a message, such as a radio transmission received in the communications module 180 of the vehicle 105-2, specifying the fault and possibly other information, such as a location of a faulty lamp 131 on the vehicle 105-1, an actual dimension such as an actual width of the vehicle 105-1, etc. Alternatively or additionally, vehicle 105-2 sensors 115 could provide data for detecting a fault in another vehicle 105-1 (so even if the vehicle 105-2 does not receive a message from the vehicle 105-1 concerning the fault in the lamp in the vehicle 105-1, the fault may nonetheless be detected). If a fault in another vehicle 105-1 is detected, then the process 600 proceeds to a block 630. Otherwise, the process 600 proceeds to a block 650.

In the block 630, the computer 110 in a second vehicle 105-2 having detected a fault in a lamp 131 of a first vehicle 105-1, the computer 110 commands or causes actuation of a component of the second vehicle 105-2, such as the HMI 170, lighting 130, propulsion 135, braking 140, and/or steering 145, as described above.

In the block 650, which may follow one of the blocks 620, 630, it is determined whether the process 600 should continue. For example, an operator could deactivate the process 600, a vehicle 105-2 could be powered down or could stop, etc. If the process 600 is to continue, the process returns to the block 610. Otherwise, the process 600 ends following the block 650.

Figure 7:
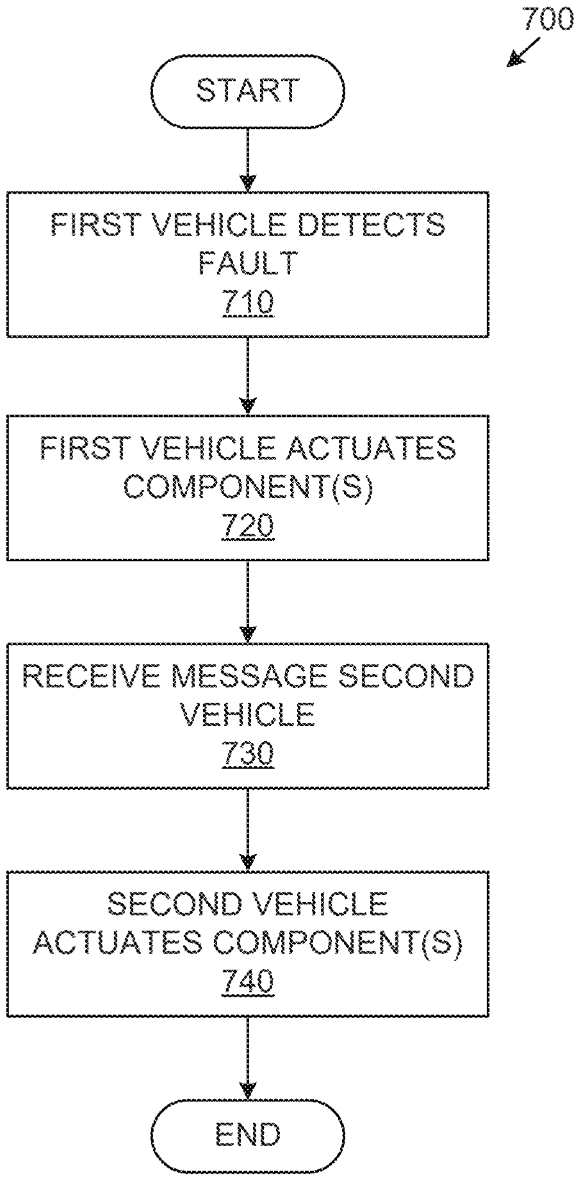
FIG. 7 is a diagram of an example process for cooperatively operating vehicles with light-responsive operation.

FIG. 7 is a diagram of an example process 700 for cooperatively operating vehicles with light-responsive operation.

The process 700 begins in a block 710, in which a first vehicle 105-1 detects a fault in a lamp 131.

Next, in a block 720, the first vehicle 105-1 actuates one or more components in the first vehicle 105-1, as described above, including sending a message specifying the fault in the lamp 131, such as via a radio transmission. The first vehicle 105-1 may also actuate one or more components to provide infrared light or heat and/or to move the first vehicle 105-1 as described above.

Next, in a block 730, the second vehicle 105-2 receives the message sent by the first vehicle 105-1.

Next, in a block 740, the second vehicle 105-2 actuates one or more components in the second vehicle 105-2, such as described above.

Following the block 740, the process 700 ends.

Concluding Remarks

Systems and methods described herein may be modified and/or omitted depending on the context, situation, and applicable laws, rules, and regulations. Further, regardless of actions that may be taken by a vehicle such as a computer controlling a vehicle, users should use good judgement and common sense when operating the vehicle. Operations described herein should always be implemented and/or performed in accordance with the owner manual and safety guidelines.

The computing devices discussed herein, including computer 110, include processors and memories. The memories generally including instructions executable by one or more of the computing devices' processors, such as instructions disclosed in the foregoing, and instructions for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions (e.g., from a memory, a computer readable medium, etc.), and executes these instructions, thereby causing one or more actions and/or processes to occur, including one or more of the processes described herein. Such instructions and other data may be stored and transmitted using a variety of computer readable media. A file in the computer 110 is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory.

Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in above description of processing, one or more of the steps could be omitted, or the steps could be executed in a different order than shown and described. In other words, the descriptions of systems and/or processes herein are provided for the purpose of illustrating certain embodiments and should in no way be construed so as to limit the disclosed subject matter.

"Based on" means based at least in part on unless explicitly stated otherwise. That is, the phrase "based on" encompasses being partly or entirely based on. Therefore, if A is "based on" B, this means that A could be entirely determined based on B, or could be determined based on B and some other factor or factors.

Accordingly, it is to be understood that the present disclosure, including the above description and the accompanying Figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise.

The invention claimed is:

1. A system, comprising:

a first computer for a first vehicle; and a second computer for a second vehicle;

wherein the first computer is programmed to:

upon detecting a fault for a lamp of the first vehicle, and responsive to determining a difference between a perceived dimension of the first vehicle and an actual dimension of the first vehicle, actuate one or more components of the first vehicle to communicate with the second vehicle; and the second computer is programmed to:

upon detecting the fault for the lamp of the first vehicle, determine an actual dimension of the first vehicle based on data from the first vehicle; and responsive to the difference between the perceived dimension of the first vehicle and the actual dimension of the first vehicle, actuate one or more components of the second vehicle.

2. The system of claim 1, wherein the one or more components of the first vehicle includes an infrared lamp and/or a heat source, and the second computer is programmed to detect the infrared lamp and/or the heat source.

3. The system of claim 1, wherein the first computer is programmed to transmit, via a radio transmitter, a message specifying that an infrared lamp and/or a heat source is actuated, and the second computer is programmed to receive the message.

4. The system of claim 1, wherein the first computer is programmed to transmit, via a radio transmitter, a message specifying the fault for the lamp of the first vehicle and/or the actual dimension of the first vehicle.

5. The system of claim 1, wherein the one or more components of the second vehicle includes vehicle braking, steering, and/or propulsion, and actuating the vehicle braking, the steering, and/or the propulsion includes moving the vehicle laterally in a road lane.

6. A system, comprising a processor and a memory, the memory storing instructions executable by the processor, including instructions to:

upon detecting a fault for a lamp of a vehicle, compare a perceived dimension of the vehicle to an actual dimension of the vehicle; and responsive to a difference between the perceived dimension of the vehicle and the actual dimension of the vehicle, actuate one or more components of the vehicle.

7. The system of claim 6, wherein the one or more components includes an infrared lamp and/or a heat source.

8. The system of claim 6, the instructions further including instructions to transmit, via a radio transmitter, a message specifying that an infrared lamp and/or a heat source is actuated.

9. The system of claim 6, wherein the one or more components includes a puddle lamp.

10. The system of claim 6, wherein the one or more components includes braking, steering, and/or propulsion of the vehicle.

11. The system of claim 6, wherein actuating the one or more components includes actuating vehicle braking, steering, and/or propulsion to reverse a direction of travel of the vehicle.

12. The system of claim 6, wherein actuating the one or more components includes actuating vehicle braking, steering, and/or propulsion to move the vehicle laterally in a road lane.

13. The system of claim 6, the instructions further including instructions to transmit, via a radio transmitter, a message specifying the fault for the lamp of the vehicle and/or the actual dimension of the vehicle.

14. The system of claim 6, wherein detecting the fault includes predicting the fault based on environmental data and/or road data.

15. A system for a second vehicle, comprising a processor and a memory, the memory storing instructions executable by the processor, including instructions to:

upon detecting a fault for a lamp of a first vehicle, determine an actual dimension of the first vehicle based on data from the first vehicle; and responsive to a difference between a perceived dimension of the first vehicle and the actual dimension of the first vehicle, actuate one or more components of the second vehicle.

16. The system of claim 15, wherein detecting the fault for the lamp of the first vehicle includes detecting the fault based on image data.

17. The system of claim 16, wherein the image data includes infrared data.

18. The system of claim 15, wherein detecting the fault for the lamp of the first vehicle includes detecting the fault based on a radio transmission from the first vehicle.

19. The system of claim 15, wherein the one or more components of the second vehicle includes braking, steering, and/or propulsion of the second vehicle, and actuating the vehicle braking, the steering, and/or the propulsion includes reversing a direction of travel of the vehicle and/or moving the vehicle laterally in a road lane.

20. The system of claim 15, wherein the one or more components of the second vehicle includes a display, the instructions further including instructions to provide a representation of the first vehicle on the display based on the actual dimension of the first vehicle.

* * * * *